United States Patent [19]
Kawamura et al.

[11] Patent Number: 5,269,940
[45] Date of Patent: Dec. 14, 1993

[54] COMPLETE MIX FLOCCULATION PROCESS

[75] Inventors: Susumu Kawamura, San Gabriel; R. Rhodes Trussell, Pasadena; John S. Lang, Arcadia, all of Calif.

[73] Assignee: James M. Montgomery Consulting Engineers, Inc., Pasadena, Calif.

[21] Appl. No.: 692,584

[22] Filed: Apr. 29, 1991

[51] Int. Cl.$^5$ ............... B01D 21/01; B01D 21/28
[52] U.S. Cl. ................. 210/709; 210/738; 210/744
[58] Field of Search ............. 210/97, 143, 199, 205, 210/206, 208, 709, 738, 744; 366/160, 282, 298, 601

[56] References Cited

U.S. PATENT DOCUMENTS

| | | | |
|---|---|---|---|
| 3,393,055 | 7/1968 | Stevenson | 210/738 |
| 3,441,502 | 4/1969 | Tenorio | 210/738 |
| 3,594,313 | 7/1971 | Carlson | 210/709 |
| 4,544,489 | 10/1985 | Campbell et al. | 210/709 |
| 4,857,206 | 8/1989 | Choo | 210/709 |
| 4,869,595 | 9/1989 | Lang | 366/177 |
| 5,000,858 | 3/1991 | Manning et al. | 210/709 |

Primary Examiner—Peter Hruskoci
Assistant Examiner—Robert James Popovics
Attorney, Agent, or Firm—Christie, Parker & Hale

[57] ABSTRACT

A flocculation system for water treatment facilities comprises a flocculation tank having a plurality of baffles which divide the interior of the flocculation tank into a plurality of compartments. The baffles are arranged to provide intercompartmental openings between adjacent upstream and downstream compartments, which, in turn, are arranged to provide a serpentine flow path through the flocculation tank. A mechanical mixer is mounted in each compartment for supplementing the mixing energy provided by the serpentine flow, particularly during periods of low water flow rates.

17 Claims, 2 Drawing Sheets

COMPLETE MIX FLOCCULATION PROCESS

FIELD OF THE INVENTION

This invention relates to a flocculation process for the treatment of drinking water.

BACKGROUND OF THE INVENTION

Flocculation is an essential process for most modern water treatment facilities. In the flocculation process, the water to be treated is introduced to a flocculation tank or basin wherein coagulants or flocculating agents are added to and mixed with water. The coagulants or flocculating agents, e.g., aluminum or iron salts, react with impurities, such as solid inorganic particulates and form large particles, which settle out of the water downstream of the flocculation basin.

Initial flocculation processes typically involved baffled, channel-type flocculation basins. Such flocculation basins typically included around-the-end and over-and-under baffle arrangements. Baffled, channel-type flocculation basins are effective when properly designed but only for appropriate conditions while mixing energy is generally uniform in such flocculation processes, it has been found that optimum flocculation occurs in a narrow range of flow rates. This is because both mixing energy and mixing time depend on the flow rate through the tank. If the flow rate is low, there is high mixing time but low mixing energy. The result is inadequate flocculation. At high flow rates, there is high mixing energy, but low mixing time. This results in the shearing of flocculation particles which do not settle out of the system. In modern water treatment facilities, flow rates are subject to substantial changes—often the highest flow rate being six times greater than the lowest flow rate. As a result, baffled, channel-type arrangements have generally proven to be unsatisfactory.

Many modern flocculation processes now involve mechanical mixers. Such mechanical mixers include perforated panels which rotate or reciprocate in the flocculation tank, rotatable paddles, impeller-type mixers and the like. Such mechanical mixers provide adequate mixing energy, even for low flow rates, however, the mixing energy tends not to be uniform throughout the flocculation tank. Consequently, "short circuiting" occurs, i.e., a portion of the water passing through the flocculation tank passes through areas of low mixing energy and thus receives inadequate mixing time with the flocculation agent.

There is a current need for a flocculation process that provides an optimum amount of mixing energy at all flow rates and eliminates, or at least minimizes flow short circuiting through the process.

SUMMARY OF THE INVENTION

The present invention provides a flocculation system and process that provides optimum mixing at all flow rates, minimizes flow short circuiting, enables easy chemical addition and uniform chemical disbursement in the process path and provides great operational flexibility.

The flocculation system comprises one or more flocculation tanks or basins. Each flocculation basin is defined by upstream and downstream end walls and two side walls and comprises a plurality of baffles which divide the interior of the flocculation tank into a plurality of compartments. The baffles also provide intercompartmental openings between adjacent upstream and downstream compartments and are arranged to provide a serpentine path through the flocculation basin.

At least one, and preferably each compartment comprises a mechanical mixer for mixing water with flocculating agents added to the water. Preferably, the mechanical mixer is a vertical shaft impeller-type mixer.

In a particularly preferred embodiment of the invention, the flocculation system comprises two or more flocculation basins constructed in accordance with the present invention. An entrance manifold is provided to deliver water to be treated to the entrance of each flocculation basin. Each flocculation basin comprises means for reversibly blocking the entrance opening to prevent water from flowing into the flocculation basin. In this arrangement, one or more of the flocculation tanks may be closed to accommodate low flow rates and, therefore, maintain peak efficiency of those flocculation tanks remaining open.

The process comprises passing a flow of water to be treated through a flocculation basin comprising a plurality of baffles which divide the interior of the basin into a plurality of compartments and provide intercompartmental openings arranged so that the flow of water through the basin follows a serpentine path. The flocculation basin further comprises a mechanical mixer in at least one, and preferably each, compartment.

A coagulant or flocculation agent is added to the water before it enters the flocculation basin and/or at one or more locations in the flocculation basin. The water and coagulant are mixed by the mechanical mixers and as a result of the serpentine flow. Water exiting the flocculation basin is passed to a sedimentation tank where the flocculate settles out of the water.

In a preferred embodiment of the invention, a flocculating agent is added to the water before it enters the flocculation basin, preferably by means of a hydraulic diffusion flash mixer, and one or more flocculation aids are added to the water as it flows through the flocculation basin, preferably at or adjacent one or more of the intercompartmental openings.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION

Figure 1:
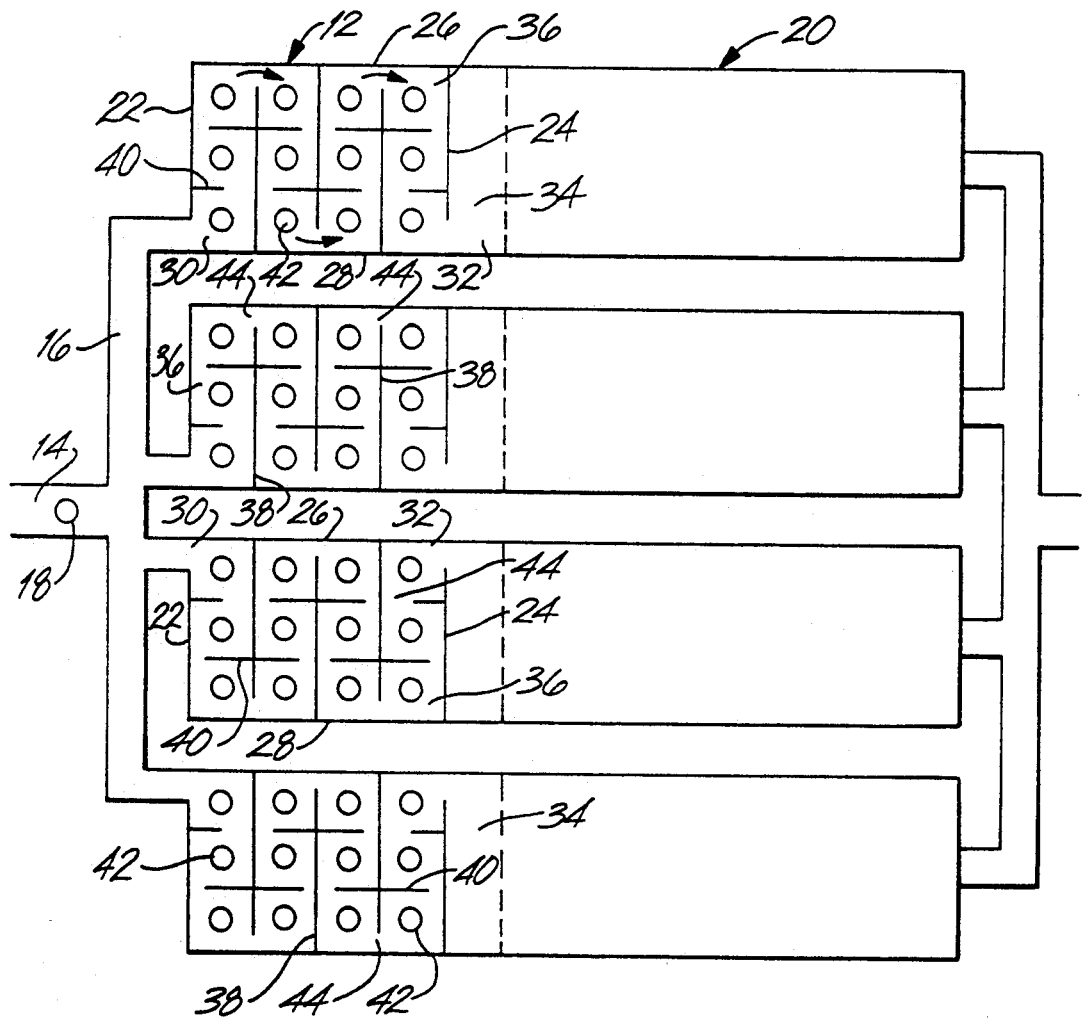
FIG. 1 is a schematic view of a preferred flocculation system constructed in accordance with the present invention.
Figure 2:
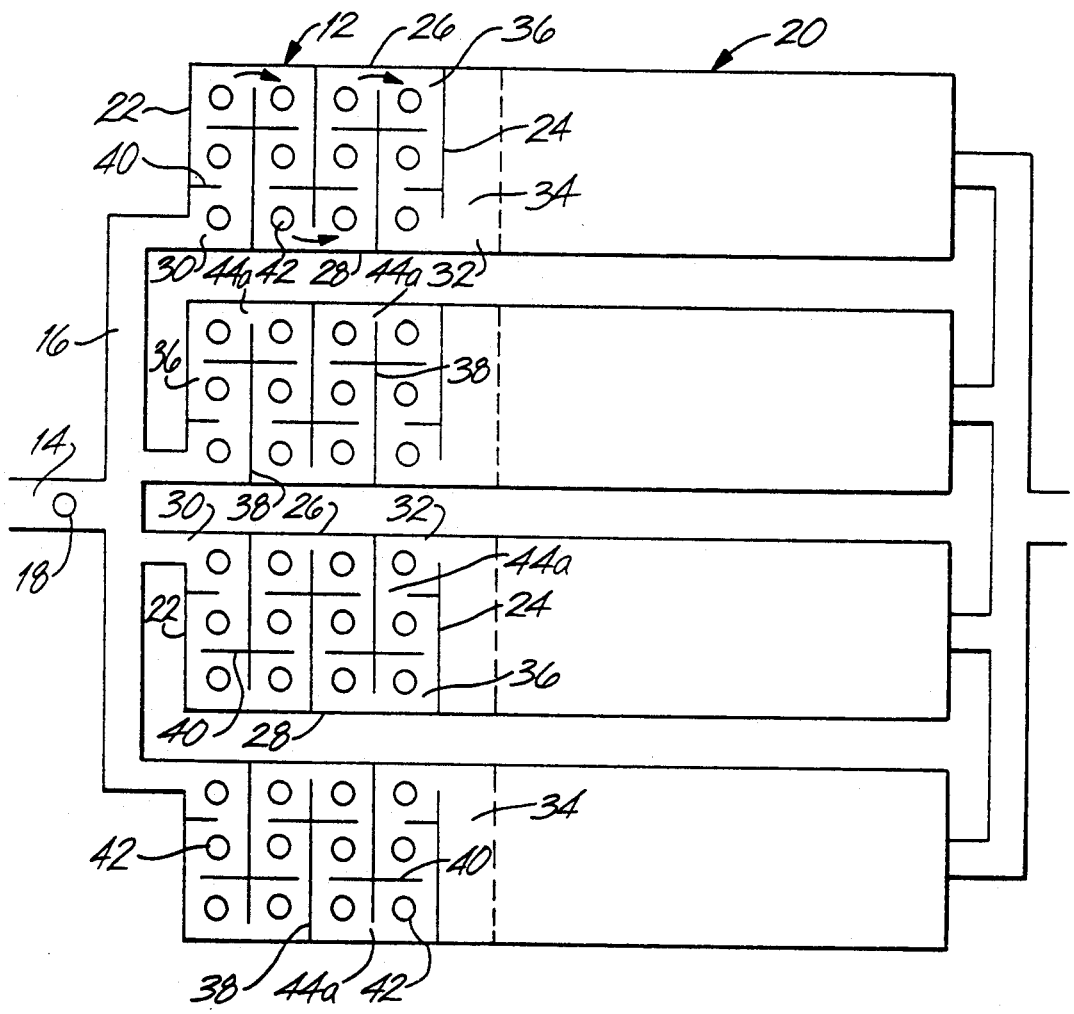
FIG. 2 is a schematic view of a variation of the preferred flocculation system of FIG. 1.

A preferred flocculation system constructed in accordance with the present invention is shown in FIG. 1. The flocculation system comprises four flocculation tanks or basins 12. An entrance channel 14 carries water to be treated to an entrance manifold 16 which distributes the water to each of the flocculation basins 12. A chemical flash mixer 18 is positioned in the entrance channel 14 for introducing coagulants or flocculating agents to the water. A presently preferred chemical flash mixer is a hydraulic diffusion flash mixer, for example, as described in U.S. Pat. No. 4,869,595 to Lang, which is incorporated herein by reference. A sedimentation tank 20 is located downstream of each flocculation basin 12.

Each flocculation basin 12 is defined by an upstream end wall 22, a downstream end wall 24, and first and second side walls 26 and 28. There is an entrance opening 30 in the upstream end wall 22 which allows water to enter the flocculation basin 12 from the entrance manifold 16. The entrance opening 30 may be closed by a gate (not shown) which may be opened and closed by electrical, hydraulic, or manual means, as is well known in the art. An exit opening 32 is provided in the downstream end wall 24 to allow water from the flocculation basin 12 to flow into a manifold compartment 34 of the sedimentation tank 20.

In the embodiment shown, the interior of the flocculation basin 12 is divided into twelve compartments 36 by three primary baffles 38 and eight secondary baffles 40. The primary baffles 38 divide the flocculation basin 12 into four generally rectangular chambers or stages. Each chamber is subdivided into three compartments 36 by secondary baffles 40. The arrangement of the primary and secondary baffles provide a serpentine fluid flow path through the flocculation basin.

It is understood that the number and size of flocculation basins 12 and the number of chambers and/or compartments 36 in each flocculation basin may vary. Generally, the number and size of flocculation basins depend on the practical depth of the basin and on the amount of water to be treated. The larger the amount of water to be treated, the larger the size and/or number of flocculation basins that will be required. The depth of the flocculation tank is a matter of choice but is generally from ten feet to about eighteen feet, and typically about fourteen feet. The deeper the tank, the less land area required for the facility. On the other hand, deeper tanks tend to be more expensive to build than shallow basins. Once the depth of the tank is selected the area of the tank can be determined by the expected flow rate.

The number of compartments selected tends to be dependent on competing factors. For example, the larger the number of compartments, the more expensive the facility is to build. On the other hand, the fewer the compartments, the poorer the performance is hydraulically.

In the embodiment shown, each compartment 36 comprises a mechanical mixer 42 to supplement the mixing energy provided by the serpentine flow during periods of low flow rate. The mixer 42 may be of any desired type. The presently preferred mixer is a vertical shaft mixer with a foil impeller having an impeller diameter to compartment width ratio of from about 0.2 to about 0.4, and preferably about 0.35.

The amount of mixing energy provided by the flocculation tank includes mixing energy provided by the baffle system and serpentine flow, which depends on the flow rate of water passing through the tank and the size of the intercompartmental openings, and mixing energy provided by the mechanical mixers.

One of the unique advantages of the present system is that the mechanical mixers are used only to supplement the mixing energy provided by the serpentine flow. This means that smaller and less expensive mechanical mixers may be used than would otherwise be required. Moreover, the mechanical mixer need not be activated all the time. For example, during periods of high flow rates, the mixing energy introduced into the water by the serpentine flow may be sufficient for optimum flocculation. In such instances, the mechanical mixers need not be activated. During periods of lower flow rates, the mechanical mixers may be activated to provide the optimum mixing energy, which, in turn, provides the optimum flocculation.

A sensor may be used for measuring the flow rate and automatically activating the mechanical mixers if the flow drops below a particular level and automatically deactivating the mechanical mixers when the flow rate rises above that level. The location of the sensor may vary as desired. Moreover, a separate sensor may be associated with each individual mixer or group of mixers.

If a variable speed mechanical mixer is used, the sensor may transmit a signal indicative of the flow rate for activating and adjusting the speed of the variable speed mixer. This latter embodiment allows a specific level of mixing energy to be maintained in the water, no matter what the flow rate.

As can be seen, the present invention provides a great deal of flexibility in the amount of mixing energy which can be introduced into the water and where that introduction occurs. By use of this invention, the amount of mixing energy can be maintained uniformly throughout the flocculation basin, or varied, for example, to provide higher mixing energy in the upstream portion of the flocculation basin and lower mixing energy in the downstream portion.

Any conventional coagulant or flocculating agent may be used with the present flocculation system. The types and amounts of coagulants will depend on the water quality (i.e. alkalinity, pH, etc.) and the types and amounts of impurities in the water. Typically, the coagulants are aluminum sulfate or cationic organic polymers. Often, flocculation aids, such as anionic polymers, are added to the water with or subsequent to the addition of the primary coagulant, e.g. , after a selective residence time, to enhance or complete the flocculation process.

In a system involving two or more flocculation basins, it is preferred that at least a portion of the coagulants be mixed with the water before the water enters the entrance manifold 16. This allows the use of a single device for introducing coagulant to the water, rather than multiple devices. It is understood, however, that the coagulant may be added to the water at other locations, e.g. the entrance of each flocculation basin, if desired. Flocculation aids may be added at any of one or more locations in the flocculation basin, but are preferably added at or adjacent the end of a baffle. Addition of the flocculation aid may be by a flash mixer or simply a metering pump, or even manually, if desired.

The precise dimensions of the flocculation basins, including size of the basin, size of the compartments and intercompartmental openings, and the size and power of the mechanical mixers depend on a variety of factors, including the highest and lowest expected flow rates. The amount of mixing energy to be imparted to the water, and whether that mixing energy is to be constant throughout the basis or varied.

In an exemplary embodiment, a flocculation system, generally as shown in FIG. 1, is designed to treat an average of 200 million gallons of water per day (MGD) with a peak flow of 300 MGD, providing a detention time of a minimum of 20 minutes. Such a detention time is typical for water treatment facilities and provides sufficient time for conventional coagulants to react with and form flocculent sufficiently large to settle out of the treated water.

If the peak flow rate is expected to be 300 MGD, and there are four flocculating basins, each basin must be able to accommodate 75 MGD. The area of the basin is calculated according to the formula:

flow rate × retention time = volume of basin

For a flow rate of 75 MGD, a retention time of 20 minutes, and a depth of 14 feet, the area occupied by the basin must be 9945 square feet.

It is preferred that the compartments be square because it is generally easier to evenly mix square tanks than a rectangular tank. Since there are 12 compartments, each compartment has an area of 828.75 square feet and each compartment side is 28.75 feet long. This means that the dimensions of the basin having a 3×4 compartment matrix will be 86.25 feet × 115 feet.

As shown in FIG. 1, there are intercompartmental openings 44 arranged to provide a serpentine flow pattern. In this exemplary embodiment, the intercompartmental openings 44 are all the same size. The size of the intercompartmental openings is selected to provide a desired head loss, and hence velocity, of the water passing through the opening at a particular flow rate. If the head loss, and hence velocity, is too low, there is a loss of control of the water flowing through the basin because the water moves too slowly. If the head loss and velocity are too high, the flocculent particles tend to shear and fall apart. In this embodiment, the intercompartmental openings are selected to provide a head loss of about one inch. Such a head loss has generally been found to provide adequate mixing energy to promote good flocculation without excessive shear.

Head loss is related to the velocity of the water flowing through the opening according to the formula:

$$h = 1.5 \frac{v^2}{2g}$$

wherein:
 h = head loss
 v = velocity
 g = gravitational acceleration (32.2 ft/sec.$^2$).

According to the above formula, the velocity for a one inch head loss would be 1.89 feet per second. The size of the intercompartmental opening is calculated according to the formula:

$$Q = vA$$

wherein:
 Q = flow rate
 v = velocity
 A = area of the opening

The opening must be sufficiently large to handle peak flow rates. Based on the above formula, the area of an opening sufficient to handle a flow rate of 75 MGD at a velocity of 1.89 feet per second is 61.4 square feet. For an opening 14 feet deep, the width of the opening is, therefore, 4.39 feet.

The mixing energy (G) in each basin provided by the serpentine flow is determined according to the following formula:

$$G = \sqrt{\frac{p}{vV}} = \sqrt{\frac{ghQ}{vV}}$$

wherein:
 p = power (foot pounds per second)
 g = gravitational acceleration (32.2 ft/sec.$^2$)
 h = head loss (1 in. = 0.083 ft.)
 Q = flow rate (75 MGD = 116 ft.$^3$/sec.)
 $v$ = viscosity (1.41×10−5 ft.$^2$/sec. at 10° C.)
 V = volume of the compartment (11,572 ft.$^3$)

The optimum mixing energy G depends on the water quality, i.e., the amount of types of impurities, the water temperature, and the types of coagulants used, and is generally between 10 and 70 sec$^{-1}$. A mixing energy G above 70 sec.$^{-1}$ generally results in a tendency of the flocculant to shear mixing energy G below 10 sec.$^{-1}$ results in inadequate mixing and inadequate flocculant formation.

At a flow rate of 75 MGD, G is 35.59 sec.$^{-1}$. At a flow rate of 50 MGD, G drops to 23.73 sec.$^{-1}$. At a flow rate of 25 MGD, the energy input G drops to 8.37 sec.$^{-1}$. If it is desired to maintain the mixing energy G within a range of, for example, 20–40 sec.$^{-1}$ adequate mixing energy is provided by the serpentine flow at flow rates of 50 and 75 MGD, but supplemental mixing energy must be provided at a flow rate of 25 MGD. If it is desired to maintain the mixing energy in the range of 30 to 40 sec.$^{-1}$, supplemental mixing energy must be provided for both the 50 and 25 MGD flow rates.

To accommodate low mixing energy resulting from low flow rates, the present invention provides a mechanical mixer in each compartment. The amount of power required by the mechanical mixer is calculated by:

$$G = \sqrt{\frac{p}{vV}}$$

wherein:
 p = power (foot pounds per second)
 $v$ = viscosity (1.41×10−5 ft.$^2$/sec. at 10° C.)
 V = volume of the compartment (11,572 ft.$^3$).

The amount of power required to raise the mixing energy G from 8.37 sec.$^{-1}$ to 30 sec.$^{-1}$ is thus calculated to be 135 ft. lbs/sec. Accordingly, a ¼ horsepower motor would be required in each compartment.

In another exemplary embodiment of the invention, as shown in FIG. 21 the velocity through each of the four chambers or stages is varied to provide the most vigorous mixing in the first chamber, i.e., first three compartments, and the least vigorous mixing in the last chamber. This is done by varying the size of the intercompartmental openings 44a to become progressively larger In the first chamber, the velocity is selected to be 2.5 ft/sec., in the second chamber, the velocity is 2.0 ft/sec., in the third chamber, the velocity is 1.5 ft/sec. and in the fourth chamber it is 1.0 ft/sec. To provide such velocities, the intercompartmental openings are 3.32, 4.12, 5.13 and 8.30 feet wide, respectively.

The intercompartmental head loss in the first chamber is calculated to be 0.146 feet (1.75 inch). In the second chamber, the head loss is 0.093 feet (1.12 inch) per compartment. In chamber three, the head loss is 0.035 feet (0.42 inch) per compartment and in chamber four, the head loss is 0.023 feet (0.28 inch) per compartment.

In this embodiment, the mixing energy (G) at a flow rate of 75 MGD is calculated to be 58.8 sec.$^{-1}$ in chamber one, 47 sec.$^{-1}$ in chamber two, 28.9 sec.$^{-1}$ in chamber three, and 23.4 sec.$^{-1}$ in chamber four. However., when the flow rate is 50 MGD, the energy input G drops to 14.6 sec.$^{-1}$, 12.0 sec.$^{-1}$, 8.9 sec.$^{-1}$, and 6.0 sec.$^{-1}$ for chambers one through four, respectively. At a flow rate of 25 MGD, the energy input G drops to 11.3 sec.$^{-1}$; 9.1 sec.$^{-1}$; 5.6 sec.$^{-1}$; and 4.5 sec.$^{-1}$, respectively.

If the desired mixing energy is that provided by the serpentine flow at 75 MGD, additional mixing energy must be provided when the flow rate drops to 50 or 25 MGD. Such additional mixing energy is supplied by mechanical mixers in each compartment. The size of the mechanical mixers is selected according to the desired total level of energy input. For example, if an additional mixing energy G of 50 sec.$^{-1}$ is required, a mechanical mixer having 1.08 horsepower is appropriate. If an additional G of 30 sec.$^{-1}$ is required, a mechanical mixer having 0.39 horsepower would be appropriate.

It is apparent that through use of the present invention, the flocculation tanks are able to provide optimum mixing energy over a very wide range of flow rates. Moreover, because a substantial amount of mixing energy is supplied by the serpentine flow design, the power requirements for mechanical mixers is much less than in conventional designs. This provides a savings both in cost of materials and energy. Finally, through the combination of serpentine flow and mechanical mixing, there is virtually no short-circuiting.

The preceding description has presented with reference to a presently preferred embodiment of the invention shown in the drawings. Workers skilled in the art and technology to which this invention pertains will appreciate that alterations and changes in the described structures can be practiced without meaningfully departing from the principle, spirit, and scope of this invention.

Accordingly, the foregoing description should not be read as pertaining only to the precise structures described and shown in the accompanying drawings, but rather, should be read consistent with, and as support to, the following claims, which are to have their fullest and fair scope.

What is claimed is:

1. A process for removing impurities from a flow of water comprising the steps of:
    introducing into the flow of water a flocculating agent reactive with impurities in the water;
    passing the flow of water containing impurities and flocculating agent through a flocculating system comprising:
        at least one flocculating tank defined by a bottom wall, upstream and downstream end walls and two side walls and comprising a plurality of baffles arranged in the interior of each flocculating tank to form a plurality of compartments having compartmental openings being serially arranged to provide a serpentine flow pathway through each flocculating tank; and
        a mechanical mixer in each compartment for imparting mixing energy to water flowing through that compartment;
    passing the water serially through the serpentine flow pathway of the intercompartmental openings and mixing the water with the mechanical mixer in each compartment; and
    passing water containing flocculate formed in each flocculating tank to a sedimentation tank wherein the flocculate settles out of the water, and wherein the compartments are defined by at least one primary baffle extending substantially perpendicularly from one of said side walls which divides the interior of the flocculating tank into at least two generally equally sized chambers; and at least two secondary baffles including one extending substantially perpendicularly from said primary baffle and one extending substantially perpendicularly from one of said end walls, which divide each chamber into at least three generally equally sized compartments.

2. A process as claimed in claim 1 wherein each compartment is square.

3. A process as claimed in claim 1 wherein each mechanical mixer comprises a vertical shaft with an impeller.

4. A process as claimed in claim 3 wherein the ratio of the diameter of the impeller to the width of the compartment is from about 0.2 to about 0.4.

5. A process as claimed in claim 4 wherein the ratio of the diameter of the impeller to the width of the compartment is about 0.3.

6. A process as claimed in claim 1 further comprising a step of measuring the flow rate of the water through the flocculating tank.

7. A process as claimed in claim 6 wherein the mixer is a variable speed mixer.

8. A process as claimed in claim 7 wherein the mechanical mixer is operated at a particular speed dependent on the water flow rate.

9. A process as claimed in claim 1 wherein the flocculating agent is introduced by hydraulic diffusion flash mixing.

10. A process as claimed in claim 1 wherein the water is passed in parallel through at least two flocculating tanks.

11. A process as claimed in claim 10 further comprising a step of measuring the flow of water through the system.

12. A process as claimed in claim 11 wherein each primary baffle is arranged such that each opening for each successive chamber is larger than the last.

13. A process as claimed in claim 1 wherein there are twelve compartments and the water is passed through the twelve compartments.

14. A process for removing impurities from a flow of water comprising the steps of:
    introducing into the flow of water a flocculating agent reactive with impurities in the water;
    passing the flow of water containing impurities and flocculating agent through a flocculating system comprising:
        at least one flocculating tank defined by a bottom wall, upstream and downstream end walls and two side walls and comprising a plurality of baffles arranged in the interior of each flocculating tank to form a plurality of compartments having compartmental openings being serially arranged to provide a serpentine flow pathway through each flocculating tank; and
        a mechanical mixer in at least one compartment for imparting mixing energy to water flowing through that compartment;
    passing the water serially through the serpentine flow pathway of the intercompartmental openings; and
    passing water containing flocculate formed in each flocculating tank to a sedimentation tank wherein the flocculate settles out of the water;
    wherein the process further comprises a step of measuring the flow rate of the water through the flocculating tank, and a step of activating the mechanical mixer when the flow rate falls below a predetermined level.

15. A process as claimed in claim 14 wherein the mechanical mixer is deactivated when the flow rate rises above a different predetermined level.

16. A process for removing impurities from a flow of water comprising the steps of:

introducing into the flow of water a flocculating agent reactive with impurities in the water;

passing the flow of water containing impurities and flocculating agent through a flocculating system comprising:

at least one flocculating tank defined by a bottom wall, upstream and downstream end walls and two side walls and comprising a plurality of baffles arranged in the interior of each flocculating tank to form a plurality of compartments having compartmental openings being serially arranged to provide a serpentine flow pathway through each flocculating tank; and a mechanical mixer in at least one compartment for imparting mixing energy to water flowing through that compartment;

passing the water serially through the serpentine flow pathway of the intercompartmental openings; and passing water containing flocculate formed in each flocculating tank to a sedimentation tank wherein the flocculate settles out of the water, the water is passed in parallel through at least two flocculating tanks;

wherein the process further comprises a step of measuring the flow of water through the system, and a step of blocking the flow of water through at least one flocculating tank when the flow rate through the system falls below a predetermined level.

17. A process for removing impurities from a flow of water comprising the steps of:

introducing into the flow of water a flocculating agent reactive with impurities in the water;

passing the flow of water containing impurities and flocculating agent through a flocculating system comprising:

at least one flocculating tank defined by a bottom wall, upstream and downstream end walls and two side walls and comprising a plurality of baffles arranged in the interior of each flocculating tank to form a plurality of compartments having compartmental openings being serially arranged to provide a serpentine flow pathway through each flocculating tank; and a mechanical mixer in at least one compartment for imparting mixing energy to water flowing through that compartment;

passing the water serially through the serpentine flow pathway of the intercompartmental openings; and passing water containing flocculate formed in each flocculating tank to a sedimentation tank wherein the flocculate settles out of the water, wherein the compartments are defined by at least one primary baffle which divides the interior of the flocculating tank into at least two generally equally sized chambers; and at least two secondary baffles which divide each chamber into at least three generally equally-sized compartments, and the primary baffles are arranged such that each successive opening from one chamber to the next is larger than the last successive opening.

* * * * *